United States Patent [19]

Fisher

[11] Patent Number: 4,923,531
[45] Date of Patent: May 8, 1990

[54] DEOXIDATION OF TITANIUM AND SIMILAR METALS USING A DEOXIDANT IN A MOLTEN METAL CARRIER

[75] Inventor: Richard L. Fisher, Warren, Ohio
[73] Assignee: RMI Company, Niles, Ohio
[21] Appl. No.: 248,227
[22] Filed: Sep. 23, 1988
[51] Int. Cl.$^5$ .............................................. C21D 1/00
[52] U.S. Cl. .................................. 148/126.1; 75/364; 148/20; 148/132; 148/133
[58] Field of Search ...................... 75/0.5 BB, 0.5 R; 148/20, 27, 126.1, 132, 133

[56] References Cited

U.S. PATENT DOCUMENTS

| | | | |
|---|---|---|---|
| 2,537,068 | 1/1951 | Lilliendahl | 75/84 |
| 2,653,869 | 9/1953 | Gregory et al. | 75/84 |
| 2,834,667 | 5/1958 | Rostron | 75/0.5 |
| 3,386,817 | 6/1968 | Layne et al. | 75/84 |
| 4,126,493 | 11/1978 | Worm | 148/20 |
| 4,373,947 | 2/1983 | Buttner et al. | 75/0.5 BB |
| 4,519,837 | 5/1985 | Down | 75/0.5 B |

OTHER PUBLICATIONS

Ono, K./Miyazaki, S., *J. Jpn. Inst. Met.* (Oct. 1985), 49 (10), 871–875.

*Primary Examiner*—Stephen J. Lechert, Jr.
*Attorney, Agent, or Firm*—Scully, Scott, Murphy & Presser

[57] ABSTRACT

Process for deoxidizing refractory metals such as titanium which contain less than about one percent oxygen. The process described includes heating a liquid metal deoxidant contained in a liquid metal carrier to treat the oxidized metal. After removing the carrier and cooling, the metal is leached to result in a treated metal with lower residual oxygen. In a preferred embodiment, titanium alloy powders are deoxidized with calcium in a sodium carrier.

18 Claims, No Drawings

DEOXIDATION OF TITANIUM AND SIMILAR METALS USING A DEOXIDANT IN A MOLTEN METAL CARRIER

FIELD OF THE INVENTION

The invention concerns a process for removing oxygen from titanium metal, similar refractory metals, and their alloys. A preferred aspect of the invention relates to the use of calcium metal dispersed in molten sodium metal to dioxidize titanium scrap or powders which contain minor amounts of oxygen.

DISCUSSION OF THE ART

It should be understood that the invention concerns a process for the deoxidation of metal and metal alloys which contain only minor amounts of oxygen, contrasted with processes for the reduction of ores to produce metal. Processes to reduce ores or metal oxides to metal usually require extreme temperatures, as shown in several disclosures: U.S. Pat. No. 2,834,667 to Rostron which teaches direct thermal reduction of titanium dioxide by using metallic magnesium at a temperature not substantially less than 1000° C.; U.S. Pat. No. 2,537,068 to Lilliendahl et al which shows the reduction of zirconium oxide or double chloride with calcium at temperatures between 1100° and 1200° C.; and U.S. Pat. No. 2,653,869 to Gregory et al which discusses the manufacture of vanadium powder from vanadium trioxide mixed with calcium and calcium chloride at a temperature between 900° and 1350° C.

A pure metal or alloy can later become contaminated with oxygen by the various cutting, machining, and heating processes used to shape and work the metal. Although processes are known which remove surface oxide scale from metal, e.g., acid pickling, shot blasting, and grinding, no practical commercial method has yet been developed to remove oxygen which has diffused into the lattice structure of the metal itself.

The use of calcium to reduce refractory metal oxides is well known, although the use of calcium to deoxidize superficially oxidized metal has been less successful. Prior art methods require high temperatures and an excess of pure, expensive calcium for this purpose. Generally these methods use multiple reductions or treatments to completely remove oxygen from the final metal. As suggested in the Rostron '667 patent, calcium could be dispersed in fused calcium chloride bath maintained at about 1000° C. or higher, and used to deoxidize titanium scrap metal. However, large excesses of calcium and calcium chloride are required.

SUMMARY OF THE INVENTION

Refractory metals selected from the group consisting of titanium, zirconium, hafnium, thorium, vanadium, niobium, tantalum, chromium, molbydenum, tungsten, and their alloys and containing less than about one weight percent oxygen can be deoxidized by contacting the metal with a mixture of a metallic dioxidant and a metal carrier. The carrier has a lower melting point then the deoxidant. The combination of the metal, dioxidant, and carrier is heated in an inert atmosphere to a temperature sufficient to liquify the dioxidant and to deoxidize the metal. When the refractory metal has been dioxidized, the carrier can be removed from the combination by distillation or other means. The treated refractory metal is washed with an acid to remove soluble oxides and any residual deoxidant or carrier metal.

DETAILED DESCRIPTION

As explained below, oxidized metals are combined with a deoxidant in a molten metal carrier, the combination is heated in an inert atmosphere, and the carrier is then removed. The treated metal can be leached with an acid to remove residual oxides of the deoxidant.

Oxidized Metals

The refractory metals, sometimes called "reactive" metals because they are highly reactive with oxygen, typically have high melting points and require substantial energy to reduce their ores.

Refractory metals suitable for treatment by the inventive process include titanium, zirconium, hafnium, thorium, vanadium, niobium, tantalum, chromium, molybdenum, tungsten, alloys of these, and alloys of the above with one or more other metals. Preferred are the Group IVA metals titanium, zirconium, and hafnium and Group VA metals vanadium, tantalum, and niobium. Of these, titanium, niobium, zirconium and vanadium are more preferred, with titanium and zirconium having particular significance for commercial reasons. As used in this patent, the term refractory metal shall be read to include alloys of the metal, unless specified otherwise.

The process is directed to the deoxidation of metals which contain oxygen in relatively small amounts as surface or interstitial impurities. Using titanium as an example, the metal contains preferably less than about one weight percent oxygen, more preferably less than about 0.5 percent. The process is effective for most alloys of the refractory metals, although it should be noted that alloys containing oxygen-scavenging elements such as yttrium, erbium, or rare earths cannot be effectively deoxidized.

The metal or alloy can be in various forms including large or small milled or finished articles, scrap material, turnings, cuttings, chips, chunks, powders, or the like. If scrap metal is used it should be cleaned if necessary with detergents, organic solvents, or by other methods to remove oil and greases. Undesired metal contaminants such as drill bits can be physically or magnetically removed. The material should also be dried if necessary to remove moisture.

The process is particularly desirable for use on metal powders because the powders retain their size and surface characteristics following deoxidation. Pure or alloyed metal powder, plasma rotating electrode powder (PREP), rapidly solidified powder (RSP), sponge fines, hydride-dehydride powder, and gas atomized powder can be treated with the inventive process.

Deoxidant

The process involves contacting the oxidized metal with a mixture of metallic deoxidant in a liquid metal carrier.

The deoxidant is a metal that can readily form oxides at the temperature of this process but does not form alloys with the refractory metal. The deoxidant's melting point must be higher than that of the carrier, and the boiling point is also preferably higher than that of the carrier. Alkaline earth elements such a calcium, barium, and strontium can generally be selected as the deoxidant, although magnesium is not effective. Calcium is preferably used because it is readily and economically available compared to other alkaline earth metals, and because it has favorable melting and boiling points when used in conjunction with the preferred metal carrier, sodium. Calcium melts at 839° C. compared to 97.8° C. for sodium, and boils at 1484° C. compared to 883° C. for sodium.

Although minimal amounts of deoxidant could have a deoxidizing effect, it is preferred to have an amount which represents a large molar excess compared to the amount of oxygen in the oxidized metal. As a guide only, the deoxidant added can be 1-3% by weight of the oxidized metal, although this can vary depending upon the surface to volume ratio of the metal, the type of metal, the amount of oxidation, and other factors.

Carrier

The carrier serves to disperse the deoxidant uniformly over the surface of the metal to be deoxidized. The carrier can be any metal that does not form alloys with the oxidized metal and is removable from the system by distillation, leaching, or other means. The carrier must also have a lower melting point than the deoxidant. Preferably, the boiling point of the carrier is above the melting point but below the boiling point of the deoxidant, which in the preferred embodiment allows good dispersion of molten deoxidant over the refractory metal and then allows selective removal of the carrier by distillation.

Alkali metals, alkaline earth metals, and zinc are among the choices, with lithium, potassium, sodium, magnesium, and zinc being preferred. Of these, sodium and magnesium, are preferred, and sodium is often chosen as the carrier.

The deoxidant and carrier can be combined and then heated, or the deoxidant can be added to the molten carrier. In the preferred embodiment, existing mixtures of calcium and sodium produced as a by-product of sodium metal manufacturing are conveniently used. These mixtures, known as "sodium sludges," are the metallic residues produced during the electrolysis of sodium and calcium fused salts followed by filtration of the liquid sodium metal. Such sludges may contain from 65 to 95 percent sodium, 5 to 35 percent calcium, and varying quantities of the oxides or chloride salts of either sodium or calcium; they melt between 110° and 200° C. depending upon composition.

If natural sodium sludge is not available a mixture of calcium and sodium may be used, with calcium representing about 1 to 35 weight percent, preferably about 1 to 10 percent, of the mixture. Relatively minor amounts of the mixture, enough to coat the surface of the metal, have been found to be effective.

Process Equipment and Procedures

The oxidized metal is preferably placed in a dry crucible made of inert metal that does not react or alloy with the refractory metal, for example titanium, titanium alloy, Hastelloy metal, stainless steel, or steel, and then mixed with the deoxidant and carrier. To avoid moisture or other sources of oxygen contamination, the mixing can be conducted using dry air, for example maintained at a dew point of minus 10° C., or preferably using an inert gas.

The crucible is placed in a dry retort which is sealed evacuated, and pressurized with any inert gas that does not react with any of the metals at the process temperatures. Nitrogen should not be used with certain metals such as titanium because it embrittles the metal. Argon is preferred. This retort can be connected to a condenser system suitable for the collection and condensation of the carrier metal vapor. Thermocouples and pressure measuring equipment can optionally be connected to the system. If desired, furnace retort can itself be used as a crucible to contain the metal and deoxidant-carrier mixture.

The retort is heated to the reaction temperature, which can be in the range of 700° to 1200° C., and held for a period of one to ten hours. The retort can be maintained at any convenient pressure from full vacuum to about twenty pounds or more of pressure. In the preferred mode of operation, the retort is held at a temperature of 900° to 1000° C. under a pressure of two to ten psig for any desired time, such as two to twelve hours. The process can alternatively be conducted at atmospheric pressure using a continuous flow of inert gas through the retort. Although a vacuum is desirable, it is critical to prevent oxygen from entering the system, and operation at a slight pressure is therefore recommended. The deoxidation process appears to be more effective at higher reaction temperatures, although furnace capabilities and crucible material pose practical operating limits. It has also been noted that the reaction proceeds well when conducted at a temperature close to or above the beta transus of the titanium metal or alloy.

At the end of the heating period, the retort is cooled under an inert gas atmosphere to near room temperature. The retort is isolated from the condenser, opened to the atmosphere, and unloaded. The treated metal, especially powdered metal, is often sintered into a large mass and can be crushed if desired to regain its original size distribution and shape characteristics. Standard crushing and materials handling equipment can be used to resize the metal. Roll or jaw crushers may be used, preferably under an inert gas blanket to avoid reoxidation of the metal.

The metal is then leached with a dilute mineral or organic acid to remove residual deoxidant and carrier, oxides of the deoxidant, or soluble metal compounds from the surfaces of the treated metal. Any suitable mineral or organic acid may be used to remove the oxide layer, provided no insoluble precipitates are formed by reaction with the deoxidant. In the preferred embodiment of the process, one-half (0.5) to three (3%) percent muriatic (hydrochloric) acid is used to remove the oxide surface layers and any free deoxidant metal from the treated metal. Nitric acid is also recommended; sulfuric acid should be avoided. Metal or organic salts may be also added to the leach solution to minimize hydrogen pickup during the leaching step. Any suitable leaching equipment can be used to accomplish the stage of the process. Batch stirred tanks, flow-through static bed equipment, or rotary leaching equipment are all suitable this purpose.

The leached metal can be washed with water until acid free and dried in either a batch or continuous dryer. It is preferable to use vacuum drying equipment to complete this stage of the process.

The dry, treated metal can be sampled and analyzed for oxygen using conventional methodology. It has been found that the oxygen level can be reduced to a level between 10 to 90 percent of the original oxygen content, depending upon alloy and conditions.

The invention is further illustrated by the following examples.

EXAMPLE 1

Titanium Scrap Metal

Pure titanium scrap turnings were washed with acetone to remove surface oil and dirt. The cleaned titanium turnings, weighing 55 grams, were mixed with 10 grams of sodium sludge cut into one-eighth inch cubes and placed into a 150 milliliter titanium beaker. The sodium sludge was obtained from a commercial sodium metal production plant and contained approximately 23% calcium. All mixing and sludge handling was done in a dry box under a dry, argon atmosphere.

The beaker was sealed with a loose fitting lid and placed into a Hastelloy metal retort. The retort was sealed and placed in a crucible furnace. The retort was evacuated and flushed with high purity argon three times prior to heating. When the temperature in the retort reached 500° C., the argon vent was closed. The temperature was raised to 840° C. and held for two hours. The retort temperature was then raised to 940° C. and held for another two hours. Pressure in the retort was maintained at 10 psig during the heating cycle.

The retort was then cooled to room temperature and opened. The titanium turnings were removed from the retort and crushed. The treating turnings were leached in three volumes of 0.5% hydrochloric acid solution in a Pyrex beaker with vigorous stirring, then washed three times with deionized water. The acid-free scrap was placed in a vacuum drying oven and dried overnight at a temperature of 110° C. and a vacuum of 23 inches Hg. The turnings were melted into a button and analyzed for oxygen. The oxygen content of the scrap had been decreased from an initial value of 0.197% to a final concentration of 0.042%, a reduction of 79%

EXAMPLE 2

6-4 Titanium Alloy

Turnings from a 6-4 titanium alloy containing 6% aluminum and 4% vanadium were mixed with 10 grams of sludge in the ratio of 5.5 to 1. The sludge contained 23% calcium. The mixture was mixed and heated in the same manner as described in Example 1. The retention times at 840° C. and 940° C. were increased to three hours each. Analysis of the purified turnings indicated that the oxygen level had decreased from a starting value of 0.255% to a final value of 0.031%, a decrease of 88 percent.

EXAMPLE 3

6-4 Titanium Alloy; Additional Deoxidant

A 55 gram sample of the 6% aluminum, 4% vanadium (6-4) titanium alloy turnings used in Example 2 was heated with 10 grams of a sodium sludge containing 20 to 23% calcium. One (1) gram of pure calcium shot was added to this mixture. The reaction retort was heated to 840° C. and 940° C. for two hours at each temperature as described in Example 1. The final oxygen level of the treated turnings was found to be 0.027%, a decrease of 89%.

EXAMPLE 4

6224 Titanium Alloy

A 60 gram sample of 6% aluminum, 2% molybdenum, 2% tin, 4% zirconium (6224) titanium alloy was treated with 5 grams of sodium sludge similar to that used in the first three examples. The internal temperature of the retort was maintained at 830° C. and 950° C. for one hour at each temperature under a pressure of 2 psig and 10 psig respectively. The temperature was maintained at 950° C. for one additional hour with a small argon flow through the system at a retort pressure of 2 psig. The analysis of the treated sample showed that an original oxygen content of 0.325% had been lowered to 0.023%, a decrease of 93%.

EXAMPLE 5

Titanium Alloy Powder

A 60 gram sample of minus 30 mesh 6% aluminum, 6% vanadium, 2% tin titanium alloy powder produced by the plasma rotating electrode process (PREP) was mixed with a 2.5 grams of sodium sludge containing 20 to 25% calcium in a dry box in which an argon atmosphere was maintained. The sludge was precut into 1/8 inch cubes and blended with the powder in a 150 ml titanium beaker. The beaker was covered with a loose fitting lid and transferred to a high temperature alloy furnace retort. The retort was evacuated and refilled with high purity argon three times prior to heating.

The temperature of the retort was increased gradually to 500° C. and the argon vent was closed. The temperature was again increased to a temperature of 845° C. and was held constant for one hour at a retort pressure of 10 psig. The temperature was then raised to 880° C. and was maintained for two hour at a retort pressure of 2 psig. During the last hour of heating, argon gas was allowed to vent from the retort at a nominal rate.

The furnace was turned off and the retort was cooled to room temperature. The retort was opened and the reaction products were removed from the titanium beaker. The mass was crushed using a laboratory mortar and pestle to a size which would pass through a 40 mesh per inch screen. The crushed powder was leached with three volumes of dilute (0.5%) hydrochloric acid and washed with three volumes of deionized water. Acid leaching and washing was conducted with vigorous stirring. The wet powder was dried in a vacuum oven at 110° C. and a vacuum of 23 inches Hg until thoroughly dry.

The treated powder was sampled and analyzed for residual oxygen content. Analysis showed that the residual oxygen content of the powder had been decreased 68% from a starting value of 0.174% to 0.055% as a result of the deoxidation treatment.

EXAMPLE 6

Titanium Aluminide Powder; Ti Added

A sample of minus 30 mesh, plus 80 mesh titanium alpha 2 aluminide powder weighing 100 grams was mixed with 10 grams of sodium sludge. The sludge, containing between 20 and 25% calcium, was melted at 150° C. prior to being mixed with the aluminide powder in a dry box containing a pure argon atmosphere.

Thirty grams of chemically pure titanium metal granules about one-eighth inch cubic in size were added to the mixture of sludge and powder. An additional 15 grams of the same titanium granules were spread evenly over the bottom of a 150 ml titanium beaker prior to addition of the powder, sludge, and pure titanium granules mixture. The titanium granules were added to make the resultant powder mass more porous and easier to remove from the titanium beaker as well as making the products easier to crush.

The beaker was sealed with a loose fitting lid and transferred into an alloy retort in an electrically heated crucible furnace. The retort was sealed, then evacuated and refilled with pure argon three times. The retort was then heated to a temperature of 500° C. at which time the argon vent was closed. The temperature was gradually increased to 830° C. and held constant for one hour at a retort pressure of 2 psig. The retort temperature was then raised to 930° C. and the pressure was allowed to rise to 10 psig. These conditions were held for one hour. The pressure of the retort was then lowered to 2 psig and held for another two hours at 930° C. Argon was allowed to vent from the retort at a low rate during this period.

After four hours, the furnace and retort were allowed to cool to room temperature. The retort was then opened and the contents of the titanium beaker were removed and crushed to pass through a 40 mesh screen. During the crushing operation, the larger, pure titanium granules were sieved from the powder. The crushed powder was then thoroughly leached in a 0.5% solution of muriatic acid following the same procedures detailed in Example 1. The leached powder was vacuum dried overnight at a pressure of 23 inches Hg.

Analysis of the dried power showed that the residual oxygen content had been reduced 76% from a starting value of 0.1754% to a level of 0.0412%.

EXAMPLE 7

A 113g sample of minus 140 plus 325 mesh niobium hydride-dehydride metal powder having 0.069% oxygen was treated in a manner similar to Example 5. About 9.4g sodium sludge (containing about 30% calcium) was used, with heating at 845° C. for one hour at 3 psig, then at 950° C. for four hours at the same pressure. The sample was cooled, then crushed and leached with 2% hydrochloric acid. Residual oxygen was determined to be 0.032%, a decrease of 53% following treatment.

EXAMPLE 8

A PREP powder of niobium 55-titanium 45 alloy was deoxidized with a sodium sludge having 23% calcium. The 30g sample was treated with 2.5g sludge at 845° C. for one hour, 950° C. for three hours, and finally 845° C. for an addition hour, all at 2 psig. Oxygen decreased 66% from an initial analysis of 0.056% to 0.019%.

EXAMPLE 9

About 30g of zirconium metal turnings were treated similarly to Example 1. Three grams of sodium sludge (containing 30% calcium) was heated with the zirconium at 830° C. for one hour then at 930° C. for four hours, all at one psig. Following treatment, the oxygen had decreased to 0.039% from 0.19%, or about 79%.

I claim:

1. A process for the deoxidation of an oxidized refractory metal selected from the group consisting of titanium, zirconium, hafnium, thorium, vanadium, niobium, tantalum, chromium, molybdenum, tungsten, and alloys comprising these metals, the process comprising:
   (a) combining in an inert, dry atmosphere the oxidized refractory metal, wherein the oxidized metal contains less than about one weight percent oxygen, with a mixture of metallic deoxidant contained in a molten metal carrier having a lower melting point than the deoxidant, to form a combination;
   (b) heating the combination at a temperature which is sufficient to liquify the deoxidant and for a time sufficient to at least partially deoxidize the refractory metal;
   (c) removing the carrier from the refractory metal
   (d) contacting the refractory metal, after cooling, with an acid.

2. The process of claim 1 in which the refractory metal is selected from the group consisting of titanium, zirconium, hafnium, vanadium, tantalum, niobium, and alloys containing these metals.

3. The process of claim 2 in which the metal is selected from titanium, niobium, zirconium, vanadium, and alloys containing these metals.

4. The process of claim 3 in which the metal is selected from titanium and alloys containing titanium.

5. The process of claim 1 in which the mixture comprises a deoxidant selected from the group consisting of alkali metal and alkaline earth metals, and a carrier which is different from the deoxidant and is selected from sodium, potassium, magnesium, zinc, and lithium.

6. The process of claim 5 in which the deoxidant is selected from calcium, barium, and strontium.

7. The process of claim 6 in which the deoxidant is calcium and the carrier is selected from sodium and magnesium.

8. The process of claim 7 in which the deoxidant is calcium and the carrier is magnesium.

9. The process of claim 7 in which the deoxidant is calcium and the carrier is sodium.

10. The process of claim 9 in which the calcium represents about 1 to 35 percent by weight of the mixture.

11. The process of claim 10 in which the mixture is a sodium sludge containing from about 1-25% calcium.

12. The process of claim 5 in which the combination is heated at a temperature of from 700° to 1200° C.

13. The process of claim 10 in which the combination is heated at a temperature of from 900° to 1000° C.

14. The process of claim 13 in which the sodium carrier is removed by distillation.

15. The process of claim 14 in which the cooled refractory metal is contacted with an aqueous acid solution.

16. The process of claim 15 in which the metal is contacted with hydrochloric acid having a concentration of 0.5 to 3.0 percent.

17. The process of claim 9 in which the refractory metal is selected from the group consisting of titanium, niobium, zirconium, and alloys thereof, and in which the combination of metal, deoxidant, and carrier is heated at a temperature of from 900° to 1000° C.

18. The process of claim 17 in which the metal is in the form of a powder.

* * * * *